United States Patent
Rodgers

(10) Patent No.: US 9,567,433 B2
(45) Date of Patent: Feb. 14, 2017

(54) METHODS FOR FORMING A POLYCARBONATE WITH A HYDROPHILIC SURFACE

(71) Applicant: GM GLOBAL TECHNOLOGY OPERATIONS LLC, Detroit, MI (US)

(72) Inventor: William R. Rodgers, Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 68 days.

(21) Appl. No.: 14/657,757

(22) Filed: Mar. 13, 2015

(65) Prior Publication Data
US 2016/0264729 A1    Sep. 15, 2016

(51) Int. Cl.
| | |
|---|---|
| B05D 5/00 | (2006.01) |
| C08G 64/42 | (2006.01) |
| C23C 30/00 | (2006.01) |
| C08G 64/08 | (2006.01) |
| C08G 64/18 | (2006.01) |
| C08G 64/24 | (2006.01) |
| B29C 45/00 | (2006.01) |
| B29K 69/00 | (2006.01) |
| B05D 5/10 | (2006.01) |

(52) U.S. Cl.
CPC ............ *C08G 64/42* (2013.01); *C08G 64/085* (2013.01); *C08G 64/186* (2013.01); *C08G 64/24* (2013.01); *C23C 30/00* (2013.01); *B05D 5/00* (2013.01); *B05D 5/10* (2013.01); *B29C 45/0001* (2013.01); *B29K 2069/00* (2013.01)

(58) Field of Classification Search
CPC ...................................................... B05D 5/10
See application file for complete search history.

(56) References Cited

U.S. PATENT DOCUMENTS

| | | | |
|---|---|---|---|
| 2,999,835 | A | 9/1961 | Goldberg et al. |
| 7,678,864 | B2 | 3/2010 | Lens et al. |
| 8,536,282 | B2 | 9/2013 | Lens et al. |
| 2005/0118911 | A1* | 6/2005 | Oles ............... B05D 1/18 442/118 |
| 2012/0183786 | A1 | 7/2012 | Laroche et al. |

OTHER PUBLICATIONS

Goldberg, E.P., et al., "Polycarbonate-Siloxy Copolymers and Blends", Polymer Letters, vol. 2 (1964), pp. 835-838.*
Goldberg, E.P., et al., "Polycarbonate-Siloxy Copolymers and Blends", Polymer Letters, vol. 2 (1964), pp. 835-838
Vaughn, Howard A., "The Synthesis and Properties of Alternating Block Polymers of Dimethylsiloxane and Bisphenol-A Carbonate", Polymer Letters, vol. 7 (1969), pp. 569-572
Palumbo, Fabio., et al. "SuperHydropobic and SuperHydrophilic Polycarbonate by Tailoring Chemistry and Nano-texture with Plasma Processing" Macromolecular Journals, vol. 8 (2011) pp. 118-126.

* cited by examiner

*Primary Examiner* — James M Mellott
(74) *Attorney, Agent, or Firm* — Dierker & Kavanaugh, P.C.

(57) ABSTRACT

In an example of a method disclosed herein, a polycarbonate with a hydrophilic surface is formed. An ether substituted dichlorosilane, phosgene, and a Bisphenol reactant are polymerized to form a polycarbonate including a hydrolyzable silane in its backbone chain. The hydrolyzable silane includes an alkoxy group attached to a silicon atom. The alkoxy group on the hydrolyzable silane is converted to a more hydrophilic functional group to form the polycarbonate with the hydrophilic surface.

10 Claims, 1 Drawing Sheet

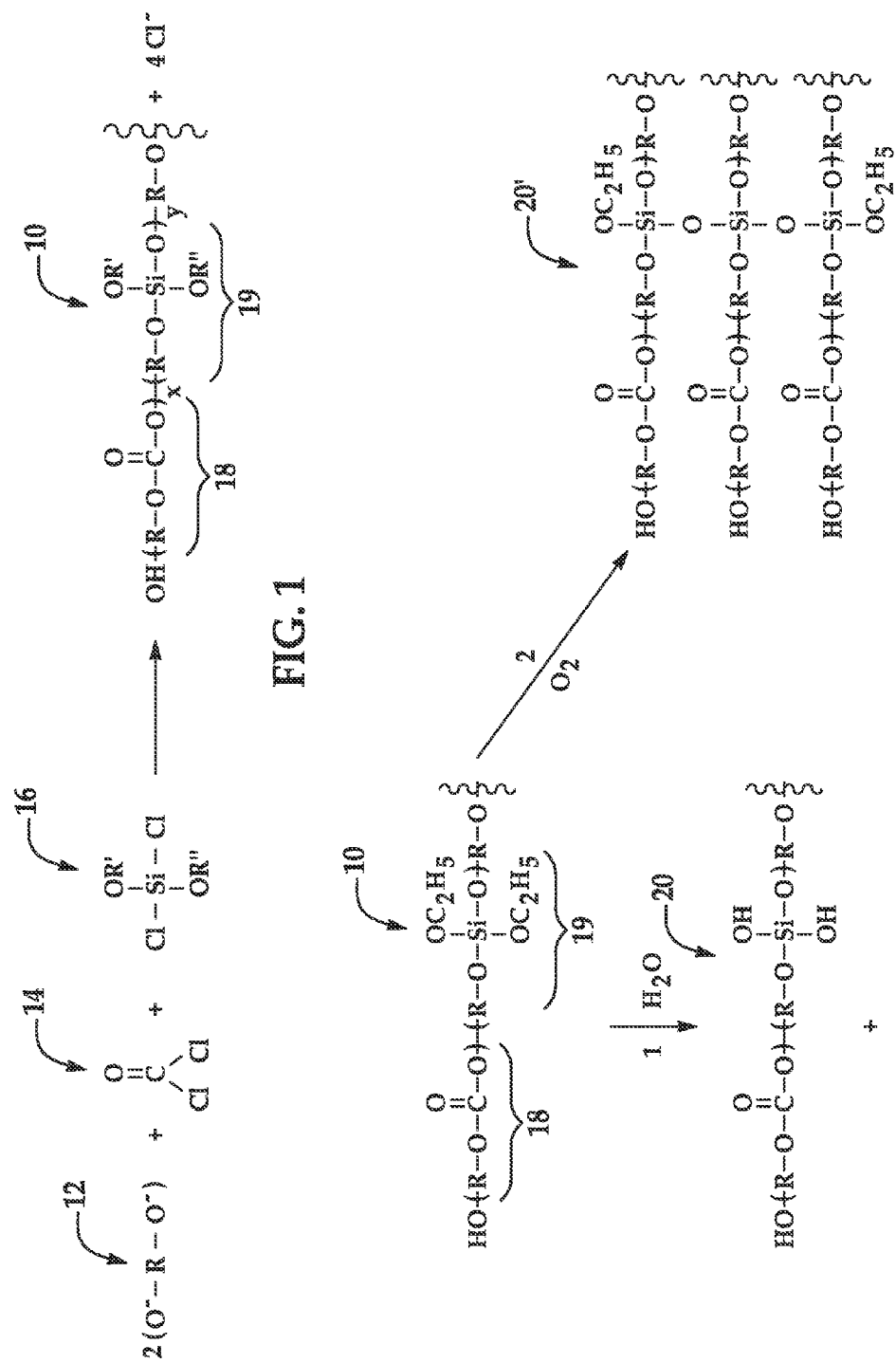

METHODS FOR FORMING A POLYCARBONATE WITH A HYDROPHILIC SURFACE

BACKGROUND

Polycarbonates are thermoplastic polymers that are easily worked, molded, and/or thermoformed, and thus are used in a variety of applications. Some of these applications include electronic components, construction materials, automotive components, aircraft components, lenses, mirrors, and lamps. The versatility of polycarbonates is accredited to the many unique properties of the polymer. These properties include, for example, high impact-resistance, low scratch-resistance, high transparency to visible light, and no electrical conductivity.

SUMMARY

In an example of the method disclosed herein, a polycarbonate with a hydrophilic surface is formed. An ether substituted dichlorosilane, phosgene, and a Bisphenol reactant are polymerized to form a polycarbonate including a hydrolyzable silane in its backbone chain. The hydrolyzable silane includes an alkoxy group attached to a silicon atom. The alkoxy group on the hydrolyzable silane is converted to a more hydrophilic functional group to form the polycarbonate with the hydrophilic surface.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a reaction scheme illustrating an example of a method for forming a polycarbonate including a hydrolyzable silane in its backbone chain; and FIG. 2 is a reaction scheme which illustrates examples of methods for forming examples of the polycarbonate with the hydrophilic surface, as disclosed herein.

DETAILED DESCRIPTION

Polycarbonates are versatile materials, which may be used in a variety of industries and products. For example, in the automotive and aircraft industries, polycarbonates may be used to form protective lenses for head and/or tail lamps. Polycarbonates are suitable for these types of products due, in part, to their transparency and durability. Injection-molded polycarbonate has a smooth surface, which is suitable for the deposition of aluminum to form mirrors or other optical reflectors.

A transparent polycarbonate component (e.g., a lens) may fog when water vapor condenses and deposits discrete water droplets onto the surface. These water droplets may be large enough to scatter light that would otherwise pass through the transparent polycarbonate components. As such, fogging restricts the light transmission through and the optical efficiency of the polycarbonate component.

Previous attempts to control fogging in polycarbonate components have included coating the surface of the polycarbonate component with a hydrophilic coating. The hydrophilic coating causes the water to disperse uniformly on the surface of the polycarbonate, rather than forming discrete droplets that scatter light and reduce light transmission. One example of a method of applying the hydrophilic coating involves a two-step process of manufacturing or forming the polycarbonate component, and then applying the hydrophilic coating to the surface of the polycarbonate component.

Examples of the method disclosed herein form a hydrophilic surface by incorporating a hydrolyzable silane into the backbone of the polycarbonate. The hydrolyzable silane includes an alkoxy group attached to the silicon atom of the hydrolyzable silane. The alkoxy group may be converted to a more hydrophilic functional group. In one example of the method disclosed herein, the hydrophilic surface may be formed when a product, formed from the polycarbonate including the hydrolyzable silane in its backbone chain, is exposed to water during routine use of the product. In this example, the alkoxy group is converted to the more hydrophilic functional group without any additional processing steps. In other examples of the method, the hydrophilic surface may be formed by incorporating the hydrolyzable silane into the polycarbonate backbone and using additional process step(s) to convert the alkoxy group into the more hydrophilic functional group. It is to be understood that no additional coating is applied in any of the examples of the methods disclosed herein.

In the examples of the methods disclosed herein, the polycarbonate including the hydrolyzable silane in its backbone chain is formed initially. Throughout this discussion, the polycarbonate including the hydrolyzable silane in its backbone chain will be referred to as the polycarbonate 10. An example of the reaction scheme for forming the polycarbonate 10, including the hydrolyzable silane in its backbone chain, is shown in FIG. 1. The polycarbonate 10 may be formed by polymerizing several reactants, including a bisphenol reactant 12, phosgene 14, and an ether substituted dichlorosilane 16. It is to be understood that at least a portion of each of these components is incorporated into the polycarbonate backbone during the formation of the polycarbonate 10. In an example, the polycarbonate 10 includes a moiety including bisphenol A or F and a carbonate (shown as reference numeral 18) and another moiety including bisphenol A or F and a hydrolyzable silane (shown as reference numeral 19). Each of the reactants used to form the polycarbonate 10 will now be described.

As noted above, a Bisphenol reactant 12 may be used in the formation of the polycarbonate 10. As depicted in FIG. 1, the Bisphenol reactant 12 has the chemical formula $O^-\text{---}R\text{---}O^-$, where R is $(C_6H_4)C(CH_3)_2(C_6H_4)$ (i.e., $^-O(C_6H_4)C(CH_3)_2(C_6H_4)O^-$) or $(C_6H_4)CH_2(C_6H_4)$ (i.e., $^-O(C_6H_4)CH_2(C_6H_4)O^-$), or $OH\text{---}R\text{---}OH$, where R is $(C_6H_4)C(CH_3)_2(C_6H_4)$ (i.e., $HO(C_6H_4)C(CH_3)_2(C_6H_4)OH$) or $(C_6H_4)CH_2(C_6H_4)$ (i.e., $HO(C_6H_4)CH_2(C_6H_4)OH$). In some examples, the Bisphenol reactant 12 may be formed from starting materials, such as Bisphenol A, or Bisphenol F, or a mixture thereof. In other examples, the Bisphenol reactant 12 may be formed from starting materials, such as Bisphenol E (i.e., 1,1-bis (4-hydroxyphenyl) ethane), Bisphenol C (i.e., 2,2-bis (3-methyl-4-hydroxyphenyl) propane), Bisphenol B (i.e., 2,2-bis (4-hydroxyphenyl) butane), 1,1-bis (4-hydroxyphenyl)-2-methyl propane, 1,1-bis (4-hydroxyphenyl) butane, 2,2-bis (4-hydroxyphenyl) pentane, 1,1-bis (4-hydroxyphenyl) heptane, 2,2-bis (4-hydroxyphenyl) heptane, or mixtures thereof, or mixtures of any of these examples with Bisphenol A and/or Bisphenol F.

The Bisphenol reactant 12 may be the deprotonated form of any of the examples provided herein. In one example, the Bisphenol reactant 12 may be deprotonated Bisphenol A (i.e., diphenolate ion of Bisphenol A). Bisphenol A or 2,2-bis (4-hydroxyphenyl) propane (before deprotonation) has the following structure (I):

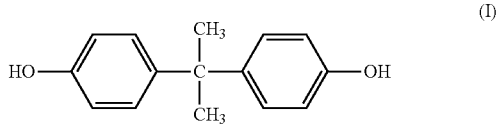 [SMILES: CC(C)(c1ccc(O)cc1)c1ccc(O)cc1]

In another example, the Bisphenol reactant 12 may also be deprotonated Bisphenol F or 4-[4-hydroxyphenyl]methyl phenol. Bisphenol F has the following structure:

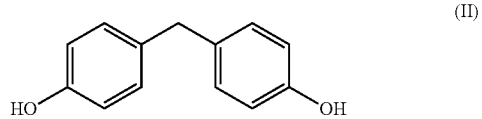 [SMILES: Oc1ccc(Cc2ccc(O)cc2)cc1]

Any of the deprotonated Bisphenol reactants may be formed by deprotonating the appropriate Bisphenol starting material (e.g., Bisphenol A, B, C, E, or F. Deprotonation may be accomplished by reacting the Bisphenol starting material with a proton acceptor (such as NaOH, KOH, etc.). Deprotonation generates polymerization functional groups ($O^-$) from the hydroxyl groups, and these polymerization functional groups can subsequently polymerize with the phosgene 14 and the ether substituted dichlorosilane 16. Deprotonated Bisphenol A and deprotonated Bisphenol F are two examples of the Bisphenol reactant 12.

Another example of the Bisphenol reactant 12 is formed from a hydroxyl substituted Bisphenol. The hydroxyl substituted Bisphenol may include an additional —OH group or an R—OH group on the ring(s) of the Bisphenol (e.g., Bisphenol A (see structure (I)) or Bisphenol F (see structure (II))). Using structure (I) for reference, the hydroxyl substituted Bisphenol A includes at least one additional hydroxyl group on one or both of the aromatic rings (noting that the position of the hydroxyl groups may be different than what is shown in structure (I)). The additional —OH group(s) or R—OH group(s) may be substituted at the ortho or meta positions on the ring(s) of the Bisphenol A or Bisphenol F or any other Bisphenol starting material.

Some examples of the hydroxyl substituted Bisphenol A with one or more additional —OH groups on the ring(s) of the Bisphenol A include 2,2-bis (3,4-dihydroxyphenyl) propane, 2,2-bis (2,4-dihydroxyphenyl) propane, 2,2-bis (2,4,6-trihydroxyphenyl) propane, 2-(3,4-dihydroxyphenyl)-2-(4-hydroxyphenyl) propane, 2-(3,4-dihydroxyphenyl)-2-(2,4-dihydroxyphenyl) propane, 2-(2,4,6-trihydroxyphenyl)-2-(4-hydroxyphenyl) propane, 2-(2,4,6-trihydroxyphenyl)-2-(2,4-dihydroxyphenyl) propane, and 2-(2,4,6-trihydroxyphenyl)-2-(3,4-dihydroxyphenyl) propane.

Some examples of the hydroxyl substituted Bisphenol F with one or more additional —OH groups on the ring(s) of the Bisphenol F include 4-[2,4-dihydroxyphenyl]methyl phenol, 4-[3,4-dihydroxyphenyl]methyl phenol, 4-[2,4,6-trihydroxyphenyl]methyl phenol, 4-[2,4-dihydroxyphenyl]methyl-2-hydroxy phenol, 4-[3,4-dihydroxyphenyl]methyl-2-hydroxy phenol, 4-[2,4,6-trihydroxyphenyl]methyl-2-hydroxy phenol, 4-[2,4-dihydroxyphenyl]methyl-3-hydroxy phenol, 4-[3,4-dihydroxyphenyl]methyl-3-hydroxy phenol, 4-[2,4,6-trihydroxyphenyl]methyl-3-hydroxy phenol, 4-[2,4-dihydroxyphenyl]methyl-2,6-dihydroxy phenol, 4-[3,4-dihydroxyphenyl]methyl-2,6-dihydroxy phenol, and 4-[2,4,6-trihydroxyphenyl]methyl-2,6-dihydroxy phenol.

When the additional group(s) is/are an R—OH group, the R may be a carbon chain including at least one carbon. In an example, the R may include one carbon atom ($CH_2$) or two carbon atoms ($C_2H_5$). Some specific examples of the hydroxyl substituted Bisphenol A with an additional R—OH group include 2,2-bis (4-hydroxy-2-hydroxymethylphenyl) propane, 2,2-bis (4-hydroxy-2-hydroxyethylphenyl) propane, 2,2-bis (4-hydroxy-3-hydroxymethylphenyl) propane, 2,2-bis (4-hydroxy-3-hydroxyethylphenyl) propane, 2,2-bis (4-hydroxy-2,5-hydroxymethylphenyl) propane, 2,2-bis (4-hydroxy-2,5-hydroxyethylphenyl) propane, 2,2-bis (4-hydroxy-3,5-hydroxymethylphenyl) propane, and 2,2-bis (4-hydroxy-3,5-hydroxyethylphenyl) propane. Some specific examples of the hydroxyl substituted Bisphenol F with an additional R—OH group include 4-[2-hydroxymethyl-4-hydroxyphenyl]methyl phenol, 4-[2-hydroxyethyl-4-hydroxyphenyl]methyl phenol, 4-[3-hydroxymethyl-4-hydroxyphenyl]methyl phenol, 4-[3-hydroxyethyl-4-hydroxyphenyl]methyl phenol, 4-[2-hydroxymethyl-4-hydroxyphenyl]methyl-2-hydroxymethyl phenol, 4-[2-hydroxyethyl-4-hydroxyphenyl]methyl-2-hydroxymethyl phenol, 4-[2-hydroxymethyl-4-hydroxyphenyl]methyl-2-hydroxyethyl phenol, and 4-[2-hydroxyethyl-4-hydroxyphenyl]methyl-2-hydroxyethyl phenol. It is to be understood that the previously listed examples are non-limiting, and that the R—OH group(s) may have other chain lengths and/or may be attached at other positions on the ring(s) of the Bisphenol A or Bisphenol F.

Any of the examples of the hydroxyl substituted Bisphenol A or Bisphenol F or any other Bisphenol starting material may be in the deprotonated form. In one example of the deprotonated form of hydroxyl substituted Bisphenol A, R of $O^-$—R—$O^-$ of FIG. 1 is $^-O(C_6H_4)C(CH_3)_2(C_6H_4)O^-$. As such, another example of the Bisphenol reactant 12 is an ion of hydroxyl substituted Bisphenol A (or deprotonated hydroxyl substituted Bisphenol A).

Phosgene 14 is another of the reactants used to form the polycarbonate 10. Phosgene 14 forms the carbonate in the moiety 18 of the polycarbonate 10.

The ether substituted dichlorosilane 16 is yet another of the reactants used to form the polycarbonate 10. FIG. 1 shows an example structure of the ether substituted dichlorosilane 16. The ether groups are shown as Si—OR' and Si—OR", and R' is $C_2H_5$ or $CH_3$ and R" is $C_2H_5$ or $CH_3$. OR' and OR" may be any alkoxy group, such as methoxy, ethyoxy, or acetoxy. The OR' and OR" may be the same or different alkoxy groups. In addition to the methyl or ethyl groups, R' and/or R" may also be an alcohol. Each alkoxy group on the ether substituted dichlorosilane 16 may be converted to a more hydrophilic functional group (discussed in detail below in reference to FIG. 2).

To form the polycarbonate 10, the Bisphenol reactant 12, the phosgene 14, and the ether substituted dichlorosilane 16 may be mixed together with a catalyst to form a reaction mixture. Some examples of the catalyst include pyridine, aluminum chloride, or magnesium metal. The Bisphenol reactant 12 may be present in the mixture at a ratio of 2:1 to the sum of the amounts of the phosgene 14 and the ether substituted dichlorosilane 16. Within the mixture, the ether substituted dichlorosilane 16 may be present in an amount ranging from about 1 wt % to about 20 wt % based on the total wt % of the chlorinated reactants. Additionally, within the mixture, the phosgene 14 may be present in an amount ranging from about 99 wt % to about 80 wt % based on the total wt % of the chlorinated reactants.

The reaction mixture may be raised to a temperature ranging from about 25° C. to about 35° C. The initial co-polymerization reaction forms a monomer having a Bisphenol and carbonate moiety 18 as well as a Bisphenol and hydrolyzable silane moiety 19. As co-polymerization continues, more of the reactants react and are incorporated into the polycarbonate 10 chain. As shown in FIG. 1, the phosgene 14 reacts with some polymerization functional group(s) (O⁻) of some of the Bisphenol reactant 12 to form a portion of the polycarbonate 10 backbone (i.e., the Bisphenol and carbonate moiety 18). Also as shown in FIG. 1, the ether substituted dichlorosilane 16 reacts with some other polymerization functional group(s) (O⁻) of some of the Bisphenol reactant 12 to form another portion of the polycarbonate 10 backbone (i.e., the Bisphenol and hydrolyzable silane moiety 19). As shown in FIG. 1, chlorine anions (Cl⁻) are produced as the leaving groups from the co-polymerization. These anions stay in the reaction solution and may associate with the alkali metal ion remaining in the solution from the deprotonation reaction to form an alkali metal salt, thereby shifting the polymerization equilibrium to the right of the equation.

The co-polymerization reaction may be stirred as co-polymerization continues. In an example, the reaction mixture is allowed to co-polymerize at the temperature previously described for a time ranging from about 1 hour to about 10 hours. In an example, the longer the reaction time of the co-polymerization reaction, the higher the molecular weight of the resulting polycarbonate 10.

After polymerization is complete, the polycarbonate 10 with the chemical structure shown in FIG. 1 is formed. In the polycarbonate 10 structure, X ranges from about 0.8 to about 0.99 and Y ranges from about 0.01 to about 0.2. As such, the Bisphenol and carbonate moiety 18 may make up from about 80% to about 99% of the polycarbonate 10 backbone chain and the Bisphenol and hydrolyzable silane moiety 19 may make up from about 1% to about 20% of the polycarbonate 10 backbone chain. The hydrolyzable silane is the Si—OR' and/or the Si—OR" portion of the moiety 19.

After polymerization is complete, the product (i.e., polycarbonate 10 including the hydrolyzable silane) may be isolated from the reaction mixture by precipitation using isopropanol. For example, following collection of the polycarbonate 10, the polymer is washed several times in isopropanol using vigorous agitation (e.g., in a blender) to fully precipitate the mixture and ensure removal of the pyridine.

The polycarbonate 10 including the hydrolyzable silane in the backbone chain may be in the form of a fine reactor flake after co-polymerization is complete. To form the hydrophilic surface, the alkoxy group attached to the hydrolyzable silane of the polycarbonate 10 is converted to a more hydrophilic group. This conversion step may be performed after the polycarbonate 10 is shaped into a product or component of a product, or while the polycarbonate 10 is in the form of a reactor flake.

Turning now to FIG. 2, the polycarbonate 10 (in its original form, e.g., flakes or after being manufactured) may be subjected to different examples of treatments to convert the alkoxy group of the hydrolyzable silane in the polycarbonate 10 backbone to the more hydrophilic functional group, thereby forming the polycarbonate 20, 20' having the hydrophilic surface. The different examples of the treatments are labeled "1" and "2" in FIG. 2. It is to be understood that none of the treatments involve adding a coating to the polycarbonate 10. Rather, the hydrophilic surface is formed as a result of altering at least some of the alkoxy groups attached to the hydrolyzable silane on the backbone of the polycarbonate 10 to form the polycarbonate 20, 20'.

As shown in FIG. 2, the polycarbonate 10 includes —C$_2$H$_5$ as R' and R" of the hydrolyzable silane in the moiety 19.

In reference to the treatment labeled "1" in FIG. 2, the polycarbonate 10, in flake form and including the hydrolyzable silane in its backbone chain, may be treated by exposing the polycarbonate 10 to water. The exposure of the polycarbonate 10 to water causes a hydrolysis reaction that causes the conversion of the alkoxy groups in the hydrolyzable silane into hydroxyl groups. In one example, as shown in FIG. 2, the —OC$_2$H$_5$ alkoxy groups of the hydrolyzable silane (—Si—OC$_2$H$_5$) are converted to hydroxyl groups (—OH), which are more hydrophilic. This conversion results in the formation of the polycarbonate 20 having a more hydrophilic surface than the surface of the polycarbonate 10, and in the formation of a by-product of ethanol (C$_2$H$_5$OH). It is to be understood that the by-product may be different depending on the type of alkoxy group present in the ether substituted dichlorosilane 16. For example, if —OCH$_3$ is the alkoxy group in the ether substituted dichlorosilane 16, the by-product produced during the conversion reaction of FIG. 2 is methanol (CH$_3$OH).

It is believed that most, if not all, of the hydroxyl groups that are formed are isolated from one another along the backbone of the polycarbonate 20 due to the relatively low concentration of the ether substituted dichlorosilane in the reaction mixture. These isolated hydroxyl groups do not react with one another, and will provide the polycarbonate 20 with the hydrophilic surface.

In some instances, however, if two hydroxyl groups of the polycarbonate 20 are close enough together along the backbone chain, they may condense to form water and an Si—O—Si bond/linkage on the surface of the polycarbonate 20. As an example, if there are several hydroxyl groups adjacent to one another along the backbone chain of the polycarbonate 20 or on adjacent polymer chains, a network of Si—O—Si bonds/linkages (i.e., —[Si—O]$_x$—) may be formed.

When the polycarbonate 10 including the hydrolyzable silane in its backbone chain is in the form of flakes, treatment "1" may be accomplished by actively exposing the polycarbonate 10 to water to convert the alkoxy group attached to the hydrolyzable silane to the more hydrophilic functional group (OH). Exposing the polycarbonate 10 to water may be accomplished by any suitable technique. For example, the polycarbonate 10 may be submerged in water, sprayed with water, exposed to high humidity, etc. It is believed that the hydrolysis begins immediately upon exposure to water and continues until no further alkoxy groups on the hydrolyzable silane remain. The exposure of the polycarbonate 10 to water causes the conversion of the alkoxy groups on the hydrolyzable silane to hydroxyl groups as described above.

The polycarbonate 20 flakes (having the hydrophilic surface) may then be used in any suitable manufacturing process, such as extrusion or compression or injection molding (described further below), to form a polycarbonate component that also has the hydrophilic surface. The polycarbonate component formed from the polycarbonate 20 may be a lens, a window, a windshield, a mirror, or another like component. When the polycarbonate component (formed of the polycarbonate 20) is to be used in the mirror, an aluminum or other reflective coating may be deposited on a surface of the polycarbonate component. The aluminum coating forms the mirrored portion and the hydrophilic polycarbonate component forms a mirror support layer for the mirrored portion. In some instances, the hydrophilic surface of the polycarbonate 20 may improve the adhesion of the reflective coating to the mirror support layer.

In other examples, the water may be applied actively or passively to the polycarbonate 10 after the polycarbonate 10 is formed into a polycarbonate component. In these instances, the polycarbonate component is initially formed of the polycarbonate 10, and then exposure to water renders the surface of the polycarbonate component into the polycarbonate 20. The conversion of the polycarbonate 10 to the polycarbonate 20 is accomplished right after the polycarbonate component is formed, or during the use of the polycarbonate component that is formed of the polycarbonate 10 (e.g., a lens, a window, a windshield, a mirror, etc.).

In these other examples then, the polycarbonate 10 is manufactured into the polycarbonate component before the conversion to the polycarbonate 20 takes place. Manufacturing the polycarbonate component from the polycarbonate 10 may be accomplished using any suitable technique, such as extrusion or compression or injection molding. The polycarbonate 10 is first melted and then is forced, under pressure, into a mold (e.g., with compression or injection molding) or a die (e.g., with extrusion) to render the polycarbonate 10 with the desired shape. Suitable shapes may include the shape of a headlamp lens for any type of vehicle, the shape of another lens, the shape of a window, the shape of a windshield for any type of vehicle, or the shape of a mirror.

When the polycarbonate component is the lens, window, or windshield, after the polycarbonate component is formed from the polycarbonate 10, it may be installed in a vehicle or used in some other suitable application. During routine use, the polycarbonate component may be exposed to water. In an example, the windshield, the vehicle headlamp or other lens, or the vehicle, home or other window may be exposed to rain water, water from a car wash, water from a hose, condensing water from fogging, etc. The water will react with the silane groups, in particular the alkoxy groups, to form the more hydrophilic hydroxyl functional groups. This transforms the polycarbonate 10 of the polycarbonate component to the polycarbonate 20 with the more hydrophilic surface.

It is to be understood that the lens, window, or windshield may also be actively exposed to water prior to its installation or use.

When the polycarbonate component is the mirror, the initial manufacturing step of extruding or compression or injection molding the polycarbonate 10 forms a mirror support layer having the desired shape for the mirror. In this example, a reflective material is applied (e.g., deposited) to a surface of the mirror support layer either before or after the conversion to the polycarbonate 20 is performed. In one example, the reflective material is aluminum. This material forms the mirrored portion of the mirror, and the polycarbonate component (which is transparent) forms the support layer for the mirrored portion. Before or after the reflective material is applied, the mirror support layer is exposed to water (passively or actively) in order to form the more hydrophilic hydroxyl functional groups and the polycarbonate 20.

FIG. 2 also depicts another example of the treatment, labeled "2", for converting the alkoxy groups attached to the hydrolyzable silane group(s) of the polycarbonate 10 to more hydrophilic group(s) to form the polycarbonate 20'. This treatment 2 involves exposing the polycarbonate 10 including the hydrolyzable silane in its backbone chain to an air plasma treatment. The plasma includes highly active oxygen atoms. In this example, the plasma treatment may be used to crosslink the surface silane groups of different polycarbonate 10 chains to each other through Si—O—Si bonds/linkages. This forms the polycarbonate 20' with the hydrophilic surface, as shown in FIG. 2. The plasma treatment also oxidizes surface groups from the Bisphenol portions (shown as R in FIG. 2) of the moieties 18, 19 in the polycarbonate 10, thereby incorporating additional oxygen atoms (not shown). These additional oxygen atoms may also participate in forming R—O—Si bonds/linkages.

Other compounds may be added to the plasma stream during the plasma treatment to provide additional silica groups. An example of these other components may be hexamethyldisiloxane. The reaction, as a result of plasma treatment, may form Si—OH in addition to the Si—O—Si bonds/linkages, in part, because some silicon atoms are not adjacent to other silicon atoms in order to crosslink and form Si—O—Si bonds/linkages.

The plasma treatment may be accomplished by any suitable plasma technique. For example, a plasma-activated bonding technique may be used, such as atmospheric pressure-plasma activated bonding (AP-PAB) or low pressure (or vacuum) plasma treatment. The plasma treatments may be air plasma treatments where a majority of the gas is nitrogen. The nitrogen activates the oxygen molecules in the air.

Similar to the water treatment 1 previously described, the plasma treatment 2 may be performed on the polycarbonate 10 including the hydrolyzable silane while it is in flake form (i.e., before subsequent manufacturing), or after it is manufactured into a desirable polycarbonate component (e.g., lens, window, windshield, mirror protective later, etc.).

Combinations of the two treatments 1, 2 may also be performed. For example, the polycarbonate 10 may be exposed to water and then to an oxygen plasma treatment to generate another form of the polycarbonate 20, 20' having the hydrophilic surface.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1 wt % to about 20 wt % should be interpreted to include not only the explicitly recited limits of from about 1 wt % to about 20 wt %, but also to include individual values, such as 3 wt %, 7 wt %, 13.5 wt %, etc., and sub-ranges, such as from about 5 wt % to about 15 wt %, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for forming a polycarbonate having a hydrophilic surface, comprising:
   polymerizing an ether substituted dichlorosilane, phosgene, and a Bisphenol reactant, thereby forming a polycarbonate including a hydrolyzable silane in its backbone chain, the hydrolyzable silane including an alkoxy group attached to a silicon atom; and
   converting the alkoxy group on the hydrolyzable silane to a more hydrophilic functional group, thereby forming the polycarbonate having the hydrophilic surface.

2. The method as defined in claim 1 wherein the converting is accomplished by exposing the polycarbonate including the hydrolyzable silane in its backbone chain to an air plasma treatment.

3. The method as defined in claim 1 wherein the converting is accomplished by exposing the polycarbonate including the hydrolyzable silane in its backbone chain to water.

4. The method as defined in claim 1, further comprising, after the converting step, manufacturing a lens, a window, a windshield, or a mirror out of the polycarbonate having the hydrophilic surface.

5. The method as defined in claim 4 wherein the manufacturing of the mirror includes:
   injection molding the polycarbonate having the hydrophilic surface in a shape of the mirror, thereby forming a mirror support layer; and
   depositing an aluminum coating on a surface of the mirror support layer.

6. The method as defined in claim 1 wherein prior to the converting of the alkoxy group on the hydrolyzable silane, the method further comprises manufacturing a lens, a window, a windshield, or a mirror out of the polycarbonate including the hydrolyzable silane in its backbone chain.

7. The method as defined in claim 6 wherein:
   the manufacturing of the lens, window, or windshield includes extruding or injection molding the polycarbonate including the hydrolyzable silane in its backbone chain in a shape of the lens, window, or windshield; and
   the converting is accomplished by exposing the lens, window, or windshield to water, which hydrolyzes the alkoxy group of the hydrolyzable silane to form the polycarbonate having the hydrophilic surface.

8. The method as defined in claim 6 wherein:
   the manufacturing of the mirror includes:
      extruding or injection molding the polycarbonate including the hydrolyzable silane in its backbone chain in a shape of the mirror, thereby forming a mirror support layer; and
      depositing an aluminum coating on a surface of the mirror support layer; and
   the converting is accomplished by exposing the mirror support layer to water, which hydrolyzes the alkoxy group of the hydrolyzable silane.

9. The method as defined in claim 1 wherein the Bisphenol reactant is deprotonated hydroxyl substituted Bisphenol A or deprotonated hydroxyl substituted Bisphenol F, the deprotonated hydroxyl substituted Bisphenol A or the deprotonated hydroxyl substituted Bisphenol F including at least one additional hydroxyl group on one aromatic ring or both aromatic rings.

10. The method as defined in claim 1 wherein the Bisphenol reactant is selected from the group consisting of deprotonated Bisphenol A, deprotonated hydroxyl substituted Bisphenol A, deprotonated Bisphenol F, and deprotonated hydroxyl substituted Bisphenol F.

* * * * *